Oct. 19, 1943.　　　　J. V. HORR　　　　2,332,148
EDUCATIONAL DEVICE
Filed April 14, 1943　　　3 Sheets-Sheet 1
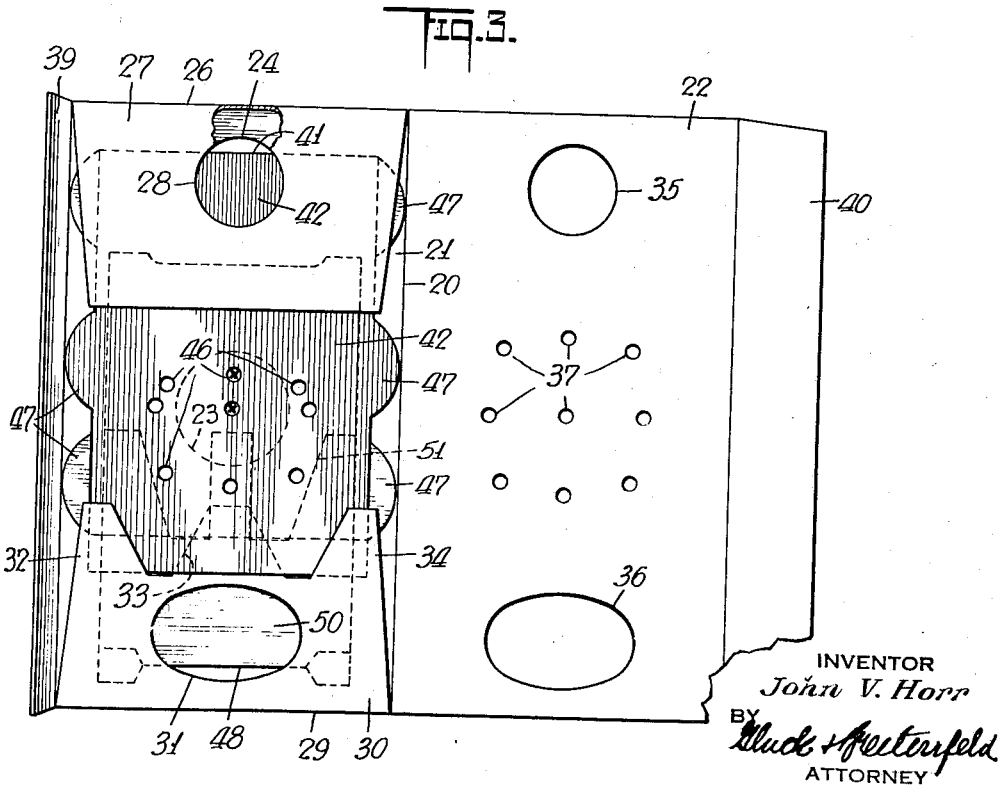
INVENTOR
John V. Horr
BY
ATTORNEY Oct. 19, 1943.   J. V. HORR   2,332,148
EDUCATIONAL DEVICE
Filed April 14, 1943   3 Sheets-Sheet 2
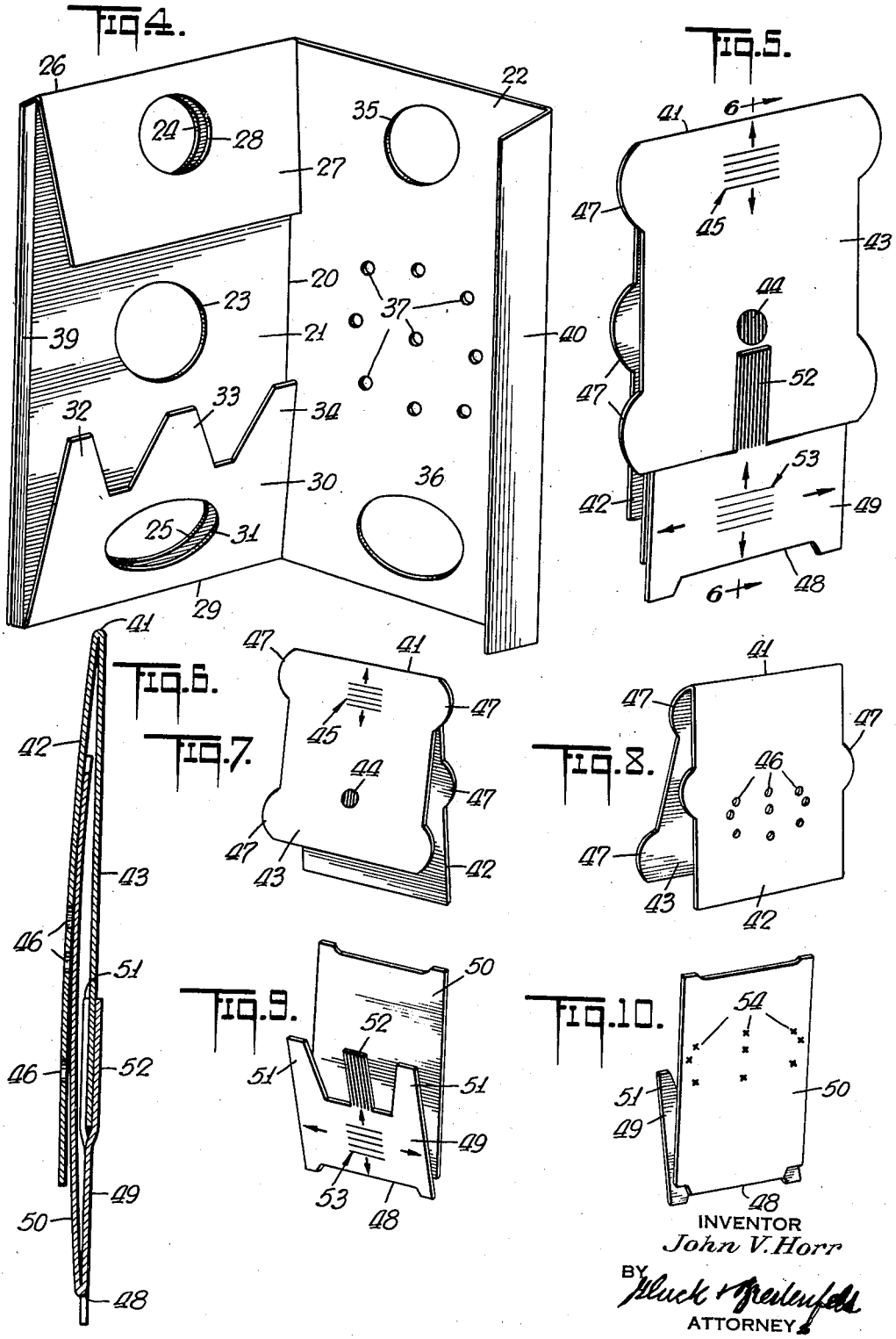
INVENTOR
John V. Horr
BY
ATTORNEYS

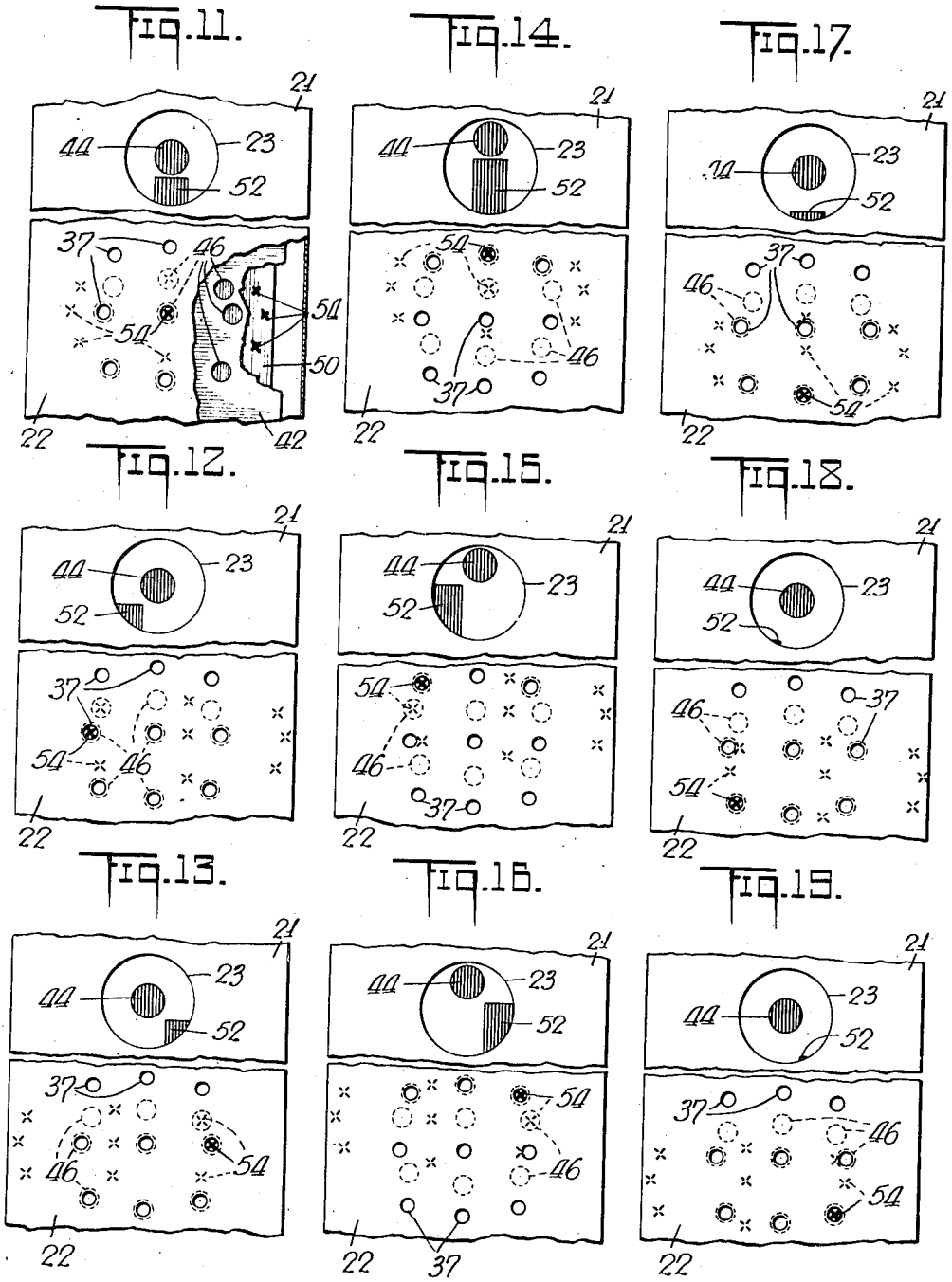

UNITED STATES PATENT OFFICE 2,332,148

EDUCATIONAL DEVICE

John V. Horr, North Tarrytown, N. Y., assignor to Einson-Freeman Co., Inc., Long Island City, N. Y., a corporation of Delaware Application April 14, 1943, Serial No. 482,987

11 Claims. (35—25)

My present invention relates generally to educational devices, and has particular reference to a relatively simple cardboard structure intended to facilitate the teaching of firearm manipulation.

As is well known, a rifle or similar firearm is provided with a rear sight and a front sight to enable the firearm to be properly aimed. These sights may assume various forms; for example, the rear sight may be a notched member while the front sight may consist of an element which assumes a vertical contour or silhouette when the firearm is aimed. Sometimes the rear sight consists of a circular opening or window to which the eye is applied.

One of the first lessons which a novice must learn is the correct relationship which the two sights must assume when the firearm is properly aimed. He must also learn the correct relative position of the target with respect to these sights.

In the training of large numbers of recruits, it is not always possible to supply each recruit with a rifle or the like, nor to devote as much time as may be desirable to individual instruction. Certain rudiments, however, may be taught by classroom procedures, prior to the actual manipulation of the firearm itself. It is a general object of my present invention to provide a simple and inexpensive cardboard structure which may be manufactured in large quantities at low cost, for free distribution to students, by means of which certain elementary features of the art may be taught with greater facility.

The present structure is of the educational type which permits certain actual manipulations to be repeatedly made and studied by the student so that he ultimately achieves a thorough and almost instinctive familiarity with certain rudimentary but essential adjustments and relationships.

Even after the instruction of the recruit has advanced to the stage where he is actually handling a firearm, the present structure has continued utility in so far as it permits the instructor to teach the corrections of certain errors or faults in a simple and expeditious manner.

From one aspect, my invention comprises a flat element having a portion which simulates the rear sight of a firearm, in association with a second flat element arranged behind the first and having a portion which simulates the appearance of the corresponding front sight of the firearm when viewed through the rear sight. The front-sight element is mounted for endwise movement or adjustment so that the two sight-simulating portions may be brought into various relationships to each other, including a correct relationship which they should assume when the firearm is properly aimed.

From another aspect, my invention consists of a flat element having a portion simulating the rear sight of a firearm, in combination with a means for simulating the appearance of the corresponding front sight when viewed through the rear sight, and a flat element arranged for endwise movement or adjustment behind the first element and provided with a portion which simulates the apearance of a target when viewed with the rear sight. The manipulations thus made possible will bring the target-simulating portion into various relationships to the sight-simulating means, including a correct relationship which should exist when the firearm is properly aimed.

In the preferred embodiment of my invention, a forward element is associated with two independent hindward elements, one of the latter having a portion simulating the appearance of the front sight, the other having a portion simulating the appearance of a target, the two hindward elements being independently movable in an endwise manner so that it is possible to bring the parts into various relationships to one another, including a correct inter-relationship which should exist when the firearm is properly aimed at a particular target.

A device embodying these general features, among others, is illustrated and described in my co-pending patent application, Ser. No. 470,981, filed Jan. 1, 1943, Patent Number 2,324,841, July 20, 1943. My present invention provides certain improvements in a device of this type, the chief improvements lying in the provision of an indicator which is adjustable into various settings which characterize the proficiency of the aim resulting from certain relationships of sights and target. A special feature of the present invention resides in an arrangement of parts whereby the indicator is automatically adjusted to a predetermined setting whenever the sights and target are adjusted into a corresponding predetermined relationship.

Briefly, the present indicator comprises relatively movable superposed wall portions carried, respectively, by the relatively fixed element which bears the simulation of the rear sight and by at least one of the movable elements, one of these wall portions having at least one aperture therein, the other having indicia thereon adapted to move into and out of registry with said aperture.

In a preferred construction, the apertured wall portion bears a representation of a target, and the apertures are arranged in a group over the target representation, preferably in a sort of concentric relationship, whereby the disclosure of the indicia (on the element beneath) through one or the other of said apertures serves as a graphic and highly effective indication of the proficiency of the aim corresponding to the relationship into which the sights and target have been adjusted.

In the preferred embodiment herein illustrated and hereinafter to be described in greater detail, the relatively fixed element is provided with a wall portion having a group of apertures therein, one of the relatively movable elements has a section arranged beneath this apertured wall portion and provided with another group of apertures, and the other movable element has an area provided with a group of indicia, the indicia and apertures being so arranged that for each of certain selected relationships of the sights and target there will be a conjunction of a predetermined one of the indicia with a pair of registering apertures.

The entire structure preferably assumes the form of a flat pocket constituting the relatively fixed element of the device, the movable element or elements being separate flat pieces accommodated within the pocket. One wall of the pocket is provided with the simulation of the rear sight, the other wall is provided with the indicator. All the parts are composed of simple elements of normally flat cardboard stock or the equivalent thereof, the manufacture and assembly of which is relatively simple and inexpensive, and the resultant device being unusually compact in nature and easy to use.

Other features of my invention, which will be described more fully hereinafter, relate to various means whereby the desired manipulations and indications are capable of simple and easy accomplishment and whereby the various parts are efficiently maintained in proper relationships to permit the contemplated manipulations to be effected.

I achieve the foregoing objects and advantages, and such other objects and advantages as may hereinafter appear or be pointed out, in the manner illustratively exemplified in the accompanying drawings, in which:

Fig. 1 is a view of one face of a device constructed in accordance with the present invention;

Fig. 2 is a view of the opposite face;

Fig. 3 is a view taken in the direction of Fig. 1 with the outer wall moved aside to reveal the interior;

Fig. 4 is a perspective view of the outer element shown by itself;

Fig. 5 is a perspective view of the assembly of inner elements;

Fig. 6 is an enlarged cross-sectional view taken substantially along the line 6—6 of Fig. 5;

Fig. 7 is a perspective view of one of the inner elements shown by itself;

Fig. 8 is a perspective view of the same element shown from the other side;

Fig. 9 is a perspective view of the other inner element shown by itself;

Fig. 10 is a perspective view of the same element shown from the other side;

Figs. 11, 12 and 13 are diagrammatic views showing the manner in which the indicator functions under one set of adjustments of the sights and the target;

Figs. 14, 15 and 16 are similar diagrammatic views relating to a different set of adjustments of the sights and target; and Figs. 17, 18 and 19 are similar diagrammatic views relating to a further set of adjustments of the sights and target.

The device consists of nothing more than the three cardboard elements shown in Figures 4, 7 and 9. In assembling the device, the elements of Figures 7 and 9 are brought together as shown in Figure 5, and this assembly is inserted into the enclosure shown in Figure 4.

The element of Figure 4 consists of a cardboard blank divided by a hinge line 20 into two substantially rectangular wall portions 21 and 22. In the wall portion 21 there is a central opening 23 preferably circular, which simulates the rear sight of a firearm. The outer surface of the wall portion 21 may be suitably embellished to enhance this simulation. In the wall portion 21 there is also provided an opening 24 near one end of the wall, and an opening 25 near the other end.

Hinged to the edge 26 of the wall portion 21 is an inwardly turned flap 27 having an opening 28 adapted to register with the opening 24. Hinged to the edge 29 of the wall portion 21 is an inwardly turned flap 30 having an opening 31 adapted to register with the opening 25. The flap 30 is also provided with three tongues 32, 33, and 34 whose purpose will be presently described.

The wall portion 22 is provided near one end with an opening 35 adapted to register with the openings 24 and 28; and it is provided near the other end with an opening 36 adapted to register with the openings 25 and 31. In the midportion of the wall 22 there is also provided a group of relatively small apertures 37, preferably arranged in a symmetrical manner. This group of apertures performs a function in connection with the indicator, and it is preferable that the outer surface of the wall 22 be suitably embellished in the region of these apertures, as shown in Figure 1. I have illustratively chosen to show a series of concentric circles or bands 38 constituting a representation of a target, the apertures 37 including one which is at the mid-point or "bull's eye" of the target, the others being arranged in other regions of the target representation.

In the device herein illustrated, the apertures 37 are nine in number, three being symmetrically arranged near the top of the target representation, three near the bottom, and three across the center.

When the device is to be assembled, the elements of Figure 5 are set into the space between the wall portion 21 and the flaps 27 and 30. A side flap 39 carried along the free longitudinal edge of the wall 21, is then turned in over the flaps 27 and 30; a similar side flap 40, carried by the free longitudinal edge of the wall 22 is turned in over the marginal part of this wall; and the wall 22 is then swung over the wall 21 to bring the exposed surfaces of the flaps 39 and 40 into contact. These surfaces are provided with suitable adhesive to retain the unit in a permanently sealed condition. It then presents the appearance shown in Figures 1 and 2. When viewed from one side, the target representation and the apertures 37 are visible, as shown in Figure 1; when viewed from the other side, the rear sight simulation 23 is visible, as shown in Figure 2.

Referring now to Figures 7 and 8, a flat element of cardboard is folded upon itself along a transverse hinge line 41 so as to provide superposed flat sections 42 and 43. At a suitable mid-portion of the section 43 there is a spot or other embellishment 44 simulating the appearance of a target, this spot being somewhat smaller than the opening 23 (see Figure 2) so that it resembles the appearance of a target when viewed through the rear sight of a firearm.

Near the top of the section 43 there may be an indicator or set of instructions 45 which will show through the opening 24 to indicate to the user that the target element is intended to be adjusted upwardly and downwardly within the enclosure.

In the section 42 there is provided a series or group of apertures 46, arranged substantially as shown in Figure 8. These apertures are preferably the same size as the apertures 37, possibly a little larger, and they form part of the indicator of the present device. In the illustrated construction, the apertures 46 are nine in number, arranged in three rows of three each. The two lower rows have the same spacing as the two lower rows of the apertures 37, but the upper row is arranged somewhat nearer to the center row, as shown most clearly in Figure 8.

Provided along the side edges of the element are the projections 47 which impart an overall width to the element of Figure 7 which is substantially the same as the width of the wall portion 21 (see Figure 3), whereby this element is limited within the enclosure to an up-and-down adjustment as indicated by the arrows forming part of the marking 45.

The element of Figures 7 and 8 will be referred to hereinafter as the "target" element.

Referring now to Figures 9 and 10, an element of cardboard is folded upon itself along a transverse hinge line 48 to define the superposed areas 49 and 50. The area 49 is provided with upwardly extending lateral tongues 51, and with a centrally-disposed tongue or portion 52, the latter being preferably of rectangular contour and suitably embellished so as to simulate the appearance of the front sight of a firearm when viewed through the rear sight thereof.

If desired, the lower region of the area 49 may be provided with the marking or set of instructions 53 which shows through the opening 25 (see Figure 2).

The outer face of the area 50 is provided with a set of indicia 54 forming part of the indicator of the present device. I have illustratively shown these indicia as consisting of a group of nine spots or crosses arranged in three rows of three each. The upper row is spaced from the center row by the same distance that the upper row of the apertures 46 (Figure 8) is spaced from the center row of these apertures. The lower row of indicia 54 is closer to the center row than the lower row of apertures 46 is from the center row of such apertures. Furthermore, the left and right vertical rows of indicia 54 are further from the center row than the corresponding left and right rows of apertures 46 are from the center row of such apertures.

The element of Figures 9 and 10 will be referred to hereinafter as the "front sight" element.

When the device is to be assembled, the target element and front sight element are first brought together as indicated in Figures 5 and 6. It will be observed that the front sight element lies entirely between the sections 42 and 43 of the target element, except for the tongue 52. This tongue is disposed on the outside of the section 43 so that it is visible, along with the target spot 44, through the rear sight opening 23 when the parts are assembled. It will be observed that the front sight element has a width somewhat narrower than that of the target element. This allows the front sight element to be adjusted laterally with respect to the target element as indicated by the side arrows forming part of the marking 53. The front sight element is also adjustable in an up-and-down direction with respect to the target element, but it remains associated with the target element during these adjustments by virtue of the interengagement of the tongues 51 and 52 with the section 43.

The manufacture of the device is extremely simple. Each of the parts shown in Figures 4, 7 and 9 is composed merely of an element of flat cardboard stock or the like, and the apertures, openings, tongues, and other features of contour are easily produced. The necessary embellishments are also of relatively simple character and may be applied by a printing process or in any other desired manner. After the independently-movable inner elements of Figures 7 and 9 are brought together into the assembled relationship of Figure 5, this assembly is inserted into the part between the wall portion 21 and the flaps 27 and 30. As shown most clearly in Figure 3, it will be noted that the section 42 of the target element is engaged with the tongues 32, 33 and 34 by disposing the tongue 33 on one side of the section 42, and the tongues 32 and 34 on the other side. This limits the downward movement of the target element. The flaps 39 and 40 are then turned in, as hereinbefore described, and are glued together so as to hold all the parts in proper relationships.

This brings the front and rear sights and the target simulation 44 into operative relationships visible from the exterior of the device when viewed as in Figure 2; and it brings the indicator parts into operative relationship. These indicator parts consist of the outer wall 22 with its apertures 37, the underlying section 42 with its apertures 46, and the innermost area 50 with its indicia 54.

The operation of the device is as follows:

By means of the openings at the top and bottom of the device, the user is enabled to make independent adjustments of the target element and of the front sight element so as to establish various relationships between the parts. For example, in each of Figures 11-13 (in the upper part of each figure), and in each of Figures 17-19 the target simulation 44 is arranged at the center of the "rear sight" opening 23. This relationship ensues when the target element of Figure 7 is in its lowermost position. When the target element is grasped (through the aligned openings 24, 28 and 35) and shifted upwardly the target simulation 44 may be brought into the relatively elevated position shown in each of Figures 14-16.

Similarly, when the front sight member is in its central position, the "front sight" 52 assumes the relationship to the "target" 44 as shown in Figure 1 and Figure 11. When grasped (through the aligned openings 25, 31 and 36) it may be shifted upwardly or downwardly, or from side to side. The upward shifting carries with it the target element and establishes the relationship shown in Figure 14. Independently of the target element, however, it may be shifted downwardly to a position such as that shown in Figure 17. When shifted to one side, it may assume any of the relationships shown in Figures 12, 15 or 18; and when shifted sideways in the opposite direction it may assume any of the relationships shown in Figures 13, 16 and 19.

Assuming that the relationship of parts shown in Figure 11 is the correct relationship which should exist when an actual firearm is properly aimed at a target, all other relationships may be considered erroneous so far the proper aiming of the firearm is concerned. For example, the relationships of Figures 14–16 might represent an error due to a dropping of the rear sight below the proper position; and the relationships of Figures 17–19 might indicate an aiming error due to a dropping of the front sight below the level at which it ought to be maintained. Similarly, the relationships shown in Figures 12, 13, 15, 16, 18, and 19 might represent errors due to a combination of faults, including a lateral misplacement of the firearm.

By manipulating the target element and the front sight element, the user of the present device is enabled to become familiar with these various relationships, and may thus be taught some of the common errors which a novice may be likely to commit.

In accordance with the present invention, the user of the device is further enabled to observe, in each case, the proficiency or lack of proficiency of the aiming of the firearm as it affects the target itself. This result is achieved by means of the indicator forming part of the present structure.

For example, assuming that the relationship of target and sights as shown in Figure 11 is a proper relationship which should exist when the firearm is properly aimed, the user may verify this fact by an inspection of the indicator. The parts of the indicator will be in the relationships shown in Figure 11 and it will be observed that the central aperture 37 is in registry with the central aperture 46, and the center one of the indicia 54 is in conjunction with these registering apertures and thus shows through at the center or "bull's eye" of the target representation 38. No other one of the indicia 54 is visible on the exterior of the device with the parts in this relationship.

Assuming now that the target element is left where it is, while the front sight element is shifted to the right or to the left, then the parts of the indicator will assume the relationships shown in either Figure 12 or Figure 13. In one case, one of the mid-lateral indicia 54 shows up through a pair of registering apertures 37 and 46 at one side of the target representation; and in the other case, the other of the mid-lateral indicia 54 shows up through another pair of registering apertures 37 and 46 at the oposite side of the target representation. No other one of the indicia 54 is visible on the exterior of the device in either case.

Again, leaving the target element where it is, and shifting the front sight element downwardly, the indicator will be adjusted into the relationships shown in Figures 17–19. If the front sight element is centrally disposed, the lower-central one of the indicia 54 will become aligned with the two lower-central registering apertures 37 and 46, as shown in Figure 17. If the front sight element is shifted laterally in one direction or the other, one or the other of the lower corner indicia 54 will become visible, as indicated in Figures 18 and 19. No other one of the indicia 54 is visible on the exterior of the device in each case.

Assuming now that the target element is shifted upwardly, this will bring the upper row of apertures 46 into registry with the upper row of apertures 37. If the front sight element is centrally disposed, the upper central indicia 54 will be brought into conjunction with the upper central registering apertures 46 and 37, as shown in Figure 14. If the front sight element is shifted laterally in one direction or the other, the indicator parts will be brought into one or the other of the relationships shown in Figures 15 and 16.

Thus, for each of a series of selected adjustments of the parts, the indicator is correspondingly and automatically adjusted into a predetermined setting which characterizes the proficiency of aim in that case.

Generally speaking, the device may be employed in either of two ways. The student may adjust the parts so that the indicator will bring one of the indicia 54 into a visible position, and he may then turn the device over and notice the relationship of sights and target which would bring about such a result on an actual target. Or the user may adjust the sights and target into different positions, and then turn the device over to observe the corresponding setting of the indicator.

Obviously, if desired, the indicator may have fewer or more apertures and corresponding indicia, as compared with the nine which have been shown herein by way of example. Similarly, it is within the purview of the invention to arrange the indicator parts on portions of the elements which are visible on the same side of the device as the sights and target.

In general, it will be understood that the details herein described and illustrated are offered merely by way of illustration, and that many of the structural details may be modified by those skilled in the art without departing from the spirit and scope of the invention as expressed in the appended claims.

Having thus described my invention and illustrated its use, what I claim as new and desire to secure by Letters Patent is:

1. An educational device of the character described, comprising a relatively fixed element provided with a portion simulating the rear sight of a firearm, a movable element arranged behind said portion and bearing a simulation of the appearance of the corresponding front sight when viewed through the rear sight, whereby said sights may be adjusted into various relationships to each other including a correct relationship which should exist when the firearm is properly aimed, and an indicator adjustable into various settings which indicate, respectively, the proficiency of the aim resulting from certain of said relationships, said indicator including means controlled by said movable element which automatically adjust said indicator to a corresponding setting.

2. An educational device of the character described, comprising a relatively fixed element provided with a portion simulating the rear sight of a firearm, means associated with said element for simulating the appearance of the corresponding front sight when viewed through the rear sight, a movable element arranged behind said portion and bearing a simulation of the appearance of a target when viewed through the rear sight, whereby said target may be adjusted into various relationships to said sights including a correct relationship which should exist when the firearm is properly aimed, and an indicator adjustable into various settings which indicate, respectively, the proficiency of the aim resulting from certain of said relationships, said indicator including means controlled by said movable element which automatically adjust said indicator to a corresponding setting.

3. An educational device of the character described, comprising a relatively fixed element provided with a portion simulating the rear sight of a firearm, independently movable elements arranged behind said portion and bearing simulations, respectively, of the appearance of the corresponding front sight and of a target when viewed through the rear sight, whereby said sights and target may be adjusted into various relationships to one another including a correct relationship which should exist when the firearm is properly aimed, and an indicator adjustable into various settings which indicate, respectively, the proficiency of the aim resulting from certain of said relationships, said indicator including means controlled by said movable elements for automatically adjusting said indicator to a corresponding setting.

4. An educational device as set forth in claim 1, said indicator comprising relatively movable superposed wall portions carried by said relatively fixed and movable elements respectively, one of said wall portions having at least one aperture therein, the other having indicia thereon adapted to move into and out of registry with said aperture.

5. An educational device as set forth in claim 1, said indicator comprising relatively movable superposed wall portions carried by said relatively fixed and movable elements respectively, the outer wall portion being carried by said relatively fixed element and having at least one aperture therein, the inner wall portion having indicia thereon adapted to move into and out of registry with said aperture.

6. An educational device as set forth in claim 1, said indicator comprising relatively movable superposed wall portions carried by said relatively fixed and movable elements respectively, one of said wall portions bearing a representation of a target and having apertures at spaced regions of said target representation, the other wall portion having indicia thereon adapted to move into and out of registry with at least one of said apertures.

7. An educational device as set forth in claim 3, said indicator comprising relatively movable superposed wall portions carried by said movable elements respectively, one of said wall portions having at least one aperture therein, the other having indicia thereon adapted to move into and out of registry with said aperture.

8. An educational device as set forth in claim 3, said indicator comprising relatively movable superposed wall portions carried by said relatively fixed and movable elements respectively, the two outer wall portions having each at least one aperture therein adapted to move into and out of registry with each other, the other wall portion having indicia thereon adapted to move into and out of registry with said registerable apertures.

9. An educational device as set forth in claim 3, said indicator comprising a relatively fixed wall portion carried by said relatively fixed element and having at least one aperture therein, and two relatively movable wall portions carried by said movable elements respectively and arranged beneath said fixed wall portion, the outer of said movable wall portions having at least one aperture therein adapted to move into and out of registry with the aperture in the fixed wall portion, the inner of said movable wall portions having indicia thereon adapted to move into and out of registry with said registerable apertures.

10. An educational device as set forth in claim 3, said indicator comprising relatively movable superposed wall portions carried by said relatively fixed and movable elements respectively, the outer wall portion bearing a representation of a target and having apertures at spaced regions of said target representation, the adjacent wall portion having a group of apertures therein each of which is adapted to move into and out of registry with at least one of said outer apertures, the inner wall portion having indicia thereon adapted to move into and out of registry with said registerable apertures.

11. An educational device of the character described, comprising a relatively fixed element provided with a portion simulating the rear sight of a firearm and provided also with a wall portion having a group of apertures therein, and independently movable elements arranged beneath said fixed element and provided, respectively, with portions simulating the appearance of a corresponding front sight and of a target when viewed through said rear sight, whereby said elements may be adjusted to bring said sights and target into various relationships, one of the relatively movable elements having a section arranged beneath the apertured wall portion of the relatively fixed element and provided with a group of apertures, the other movable element having an area arranged beneath said section and provided with a group of indicia, said indicia and apertures being so arranged that for each of certain selected relationships of the sights and target there will be a conjunction of a predetermined one of the indicia with a pair of registering apertures so as to make said indicia visible from the exterior of the device in a position which corresponds to said relationship.

JOHN V. HORR.